US012253630B2

(12) United States Patent
Takashima et al.

(10) Patent No.: US 12,253,630 B2
(45) Date of Patent: Mar. 18, 2025

(54) OPTICAL PHASED ARRAYS AND SPHERICAL SHIFT INVARIANT SENSORS FOR USE IN ADVANCED LIDAR SYSTEMS

(71) Applicant: Arizona Board of Regents on Behalf of the University of Arizona, Tucson, AZ (US)

(72) Inventors: Yuzuru Takashima, Tucson, AZ (US); Matthew Salem, Tucson, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 1052 days.

(21) Appl. No.: 17/059,575

(22) PCT Filed: May 29, 2019

(86) PCT No.: PCT/US2019/034320
§ 371 (c)(1),
(2) Date: Nov. 30, 2020

(87) PCT Pub. No.: WO2019/232001
PCT Pub. Date: Dec. 5, 2019

(65) Prior Publication Data
US 2021/0208253 A1 Jul. 8, 2021

Related U.S. Application Data

(60) Provisional application No. 62/677,313, filed on May 29, 2018.

(51) Int. Cl.
*G01S 7/481* (2006.01)
*G01S 7/4865* (2020.01)
(Continued)

(52) U.S. Cl.
CPC .......... *G01S 7/4815* (2013.01); *G01S 7/4816* (2013.01); *G01S 7/4865* (2013.01); *G01S 17/89* (2013.01); *G02B 13/06* (2013.01)

(58) Field of Classification Search
None
See application file for complete search history.

(56) References Cited

U.S. PATENT DOCUMENTS 3,618,090 A * 11/1971 Garrison ................ H01Q 3/24
342/147
5,047,776 A * 9/1991 Baller .................... H01Q 15/08
356/141.5
(Continued)

FOREIGN PATENT DOCUMENTS

| EP | 0966060 | 12/1999 |
|----|---------|---------|
| EP | 0966060 A1 | 12/1999 |

(Continued)

OTHER PUBLICATIONS

A Luneburg Lens for the Terahertz Region (Year: 2019).*
(Continued)

*Primary Examiner* — Yuqing Xiao
*Assistant Examiner* — Jempson Noel
(74) *Attorney, Agent, or Firm* — Bond, Schoeneck & King, PLLC; George R. McGuire

(57) ABSTRACT

A LIDAR system architecture which transmits light via an optical phased array and receives the reflected signal with a spherically shift invariant sensor. Phased arrays offer the ability to quickly scan a desired area by manipulating the electrical, or in this case-thermal, properties of an array of sensors. Similarly spherically shift invariant systems offer the ability to bring light into focus at the same location regardless of its angle of arrival.

14 Claims, 21 Drawing Sheets

(51) Int. Cl.
*G01S 17/89* (2020.01)
*G02B 13/06* (2006.01)

(56) References Cited

U.S. PATENT DOCUMENTS

| | | | | |
|---|---|---|---|---|
| 10,824,045 | B2* | 11/2020 | Rumpf | G02F 1/293 |
| 2004/0146257 | A1* | 7/2004 | Parker | G02B 6/1225 |
| | | | | 385/123 |
| 2013/0279850 | A1* | 10/2013 | Bravo-Abad | G02B 1/005 |
| | | | | 427/163.2 |
| 2014/0139370 | A1* | 5/2014 | Hamner | G01S 13/4463 |
| | | | | 342/175 |
| 2015/0192677 | A1 | 7/2015 | Yu et al. | |
| 2015/0346340 | A1* | 12/2015 | Yaacobi | G01S 7/499 |
| | | | | 356/5.11 |
| 2016/0124251 | A1 | 5/2016 | Zhang et al. | |
| 2017/0062948 | A1* | 3/2017 | Artemenko | H04B 7/0617 |
| 2017/0371227 | A1* | 12/2017 | Skirlo | G02F 1/2955 |
| 2018/0306950 | A1* | 10/2018 | Ackermann | G02B 27/30 |

FOREIGN PATENT DOCUMENTS

| | | |
|---|---|---|
| WO | 2017223299 | 12/2017 |
| WO | 2017223299 A1 | 12/2017 |

OTHER PUBLICATIONS

International Search Report and Written Opinion for International Application No. PCT/US19/34320 dated Aug. 9, 2019; 8 pages.
International Search Report Form PCT/ISA/210, and Written Opinion Form PCT/ISA/237, International Application No. PCT/US19/34320, pp. 1-8 International Filing Date May 29, 2019 mailing date of search report Aug. 9, 2019.
"The Optics of the Spherical Fish Lens". W.S. Jagger. Oct. 17, 1991.
"Modified Luneburg Lens Based on Metamaterials". Chen et al. Jan. 29, 2015.
https://wp.optics.arizona.edu/optomech/wp-content/uploads/sites/53/2016/11/Synopsis_Salem_Matt.pdf.
http://www.ball.com/aerospace/Aerospace/media/Aerospace/Downloads?D1650-TS_LIDAR_0416.pdf?ext=.pdf.
https://www.intechopen.com/books/radar/radar-technology/wideband-antennas-for-modern-radar-systems.
https://arstechnica.com/science/2013/01/nanoscale-antennas-etched-in-chip-provide-precise-control-of-light/.
https://www.osapublishing.org/DirectPDFAccess/B400F37F-BE92-5DBB-D42071D30FF4003B_367522/oe-25-13-14334.pdf?da=1&id=367522&seq=0&mobile=no.
https://www.osapublishing.ord/DirectPDFAccess/B40AB0AF-DBEI-1231-754DFD361DA451CD_368480/oe-25-14-16274.pdf?da=1&id=368480&seq=0&mobile=no.
http://www.jhuapl.edu/techdigest/TD/td3301/33_01-McKenna.pdf.
https://www.cambridge.org/core/services/aop-cambridge-core/content view/2334B1BCD9B56D346E823BB271E6C33E/S1759078716000295a.pdf/div-class-title-microwave-photonic-network-for-active-electronically-scanned-array-radar-div.pdf.
http://fullafterburner.weebly.com/next-gen-weapons/radio-optic-phased-array-radar-a-comprehensive-study.
https://insights.globalspec.com/article/2013/lidar-gives-sight-to-autonomous-vehicles.
https://www.distantfocus.com/projects/aware/.
http://www.renishaw.com/en/optical-encoders-and lidar-scanning—39244.

* cited by examiner

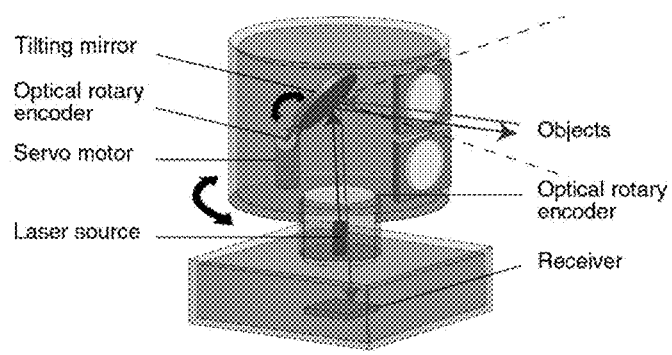
Figure 1: Traditional LIDAR Systems use tilting mirrors and servo motors to physically scan the FOV of the imaging systems
Prior Art
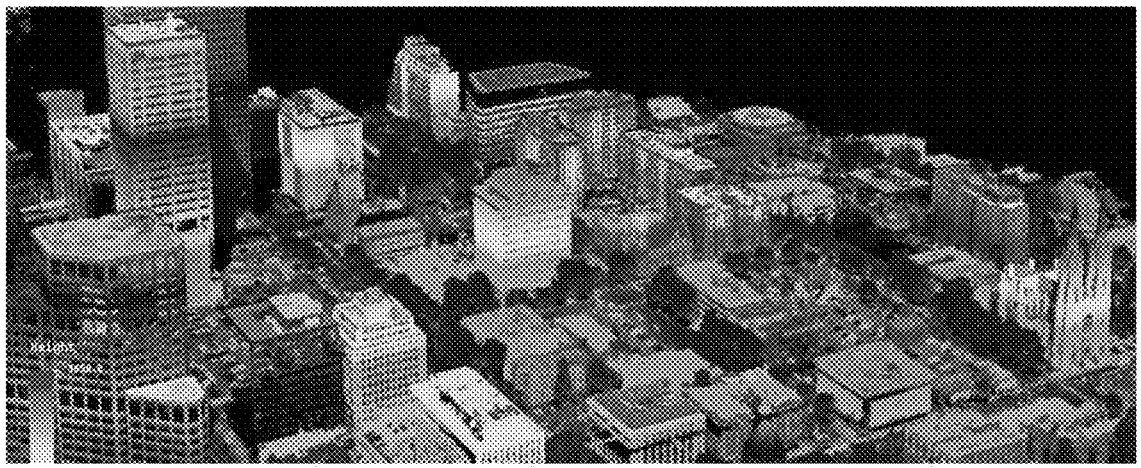
Figure 2: A 3D image created by Ball Aerospaces TotalSight[TM] system
Prior Art

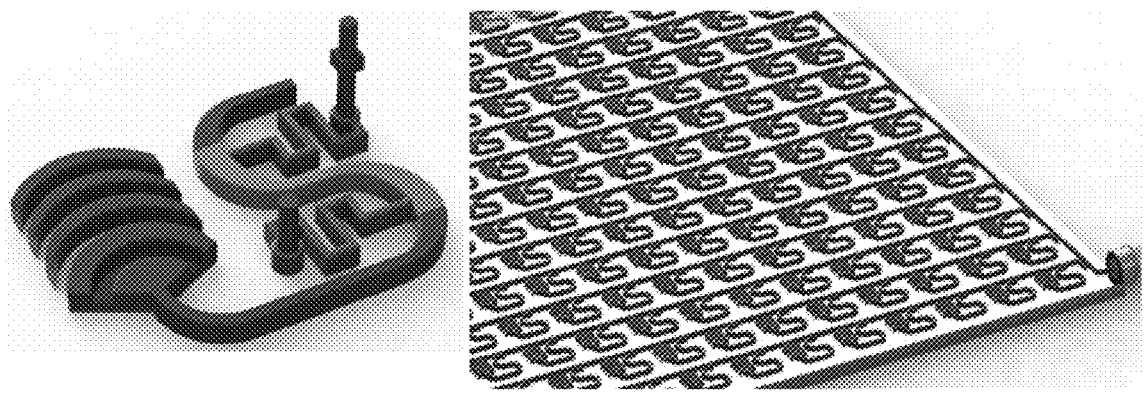
Figure 3: Optical Phased Array developed by MIT [REF]
Prior Art
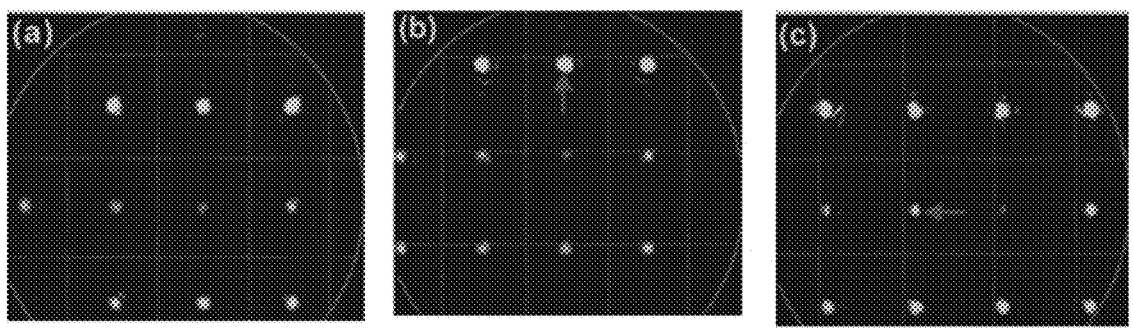
Figure 4: Radiation pattern of MIT's 64 optical phased array when even (a), vertical (b) and horizontal (c) temperature distributions are applied
Prior Art

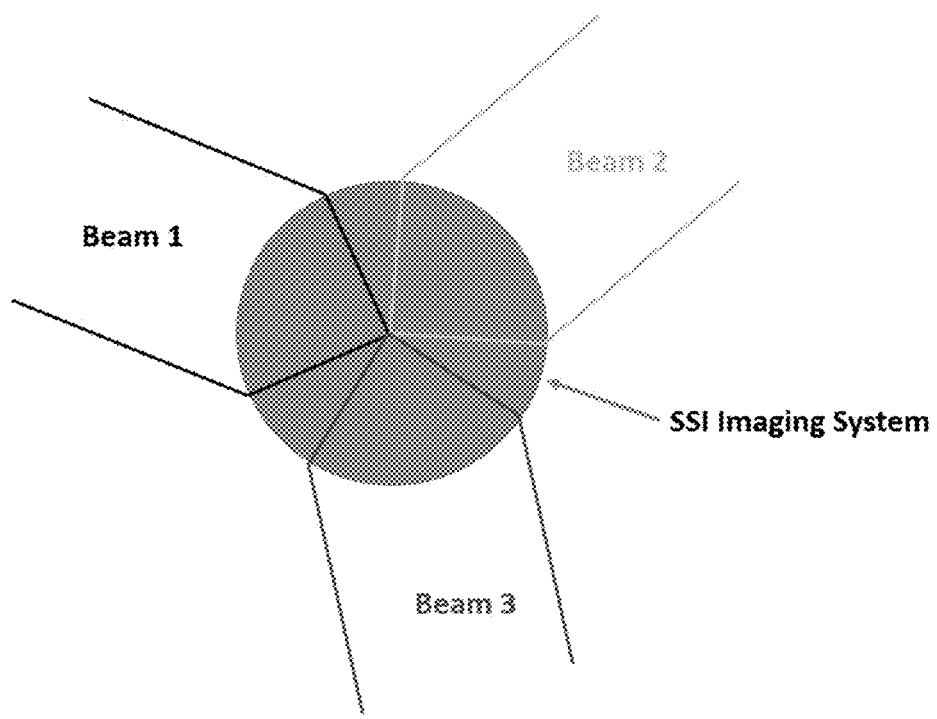
Figure 5: Raytrace of a spherically shift invariant system
Prior Art
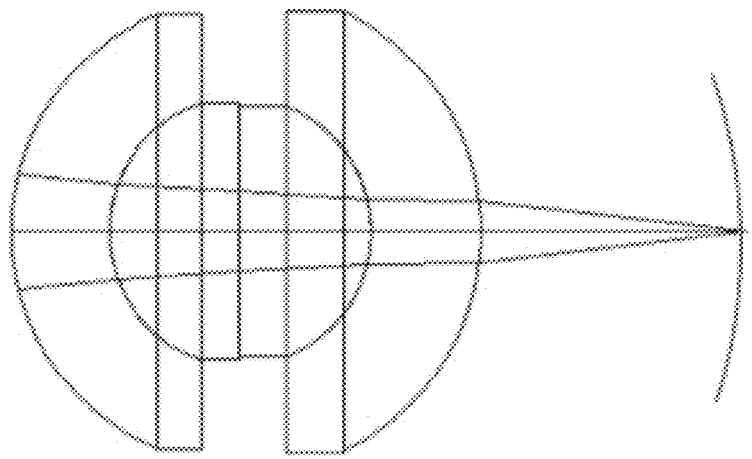
Figure 6: Raytrace of a Monocentric Objective
Prior Art

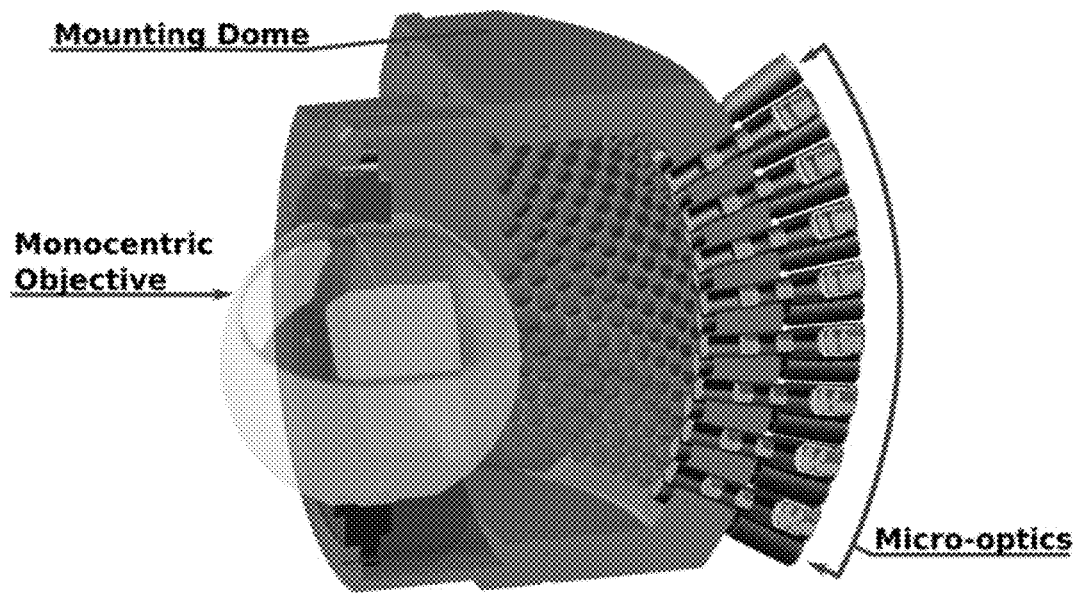
Figure 7: A Monocentric Imaging System designed by Distant Focus and Duke University
Prior Art
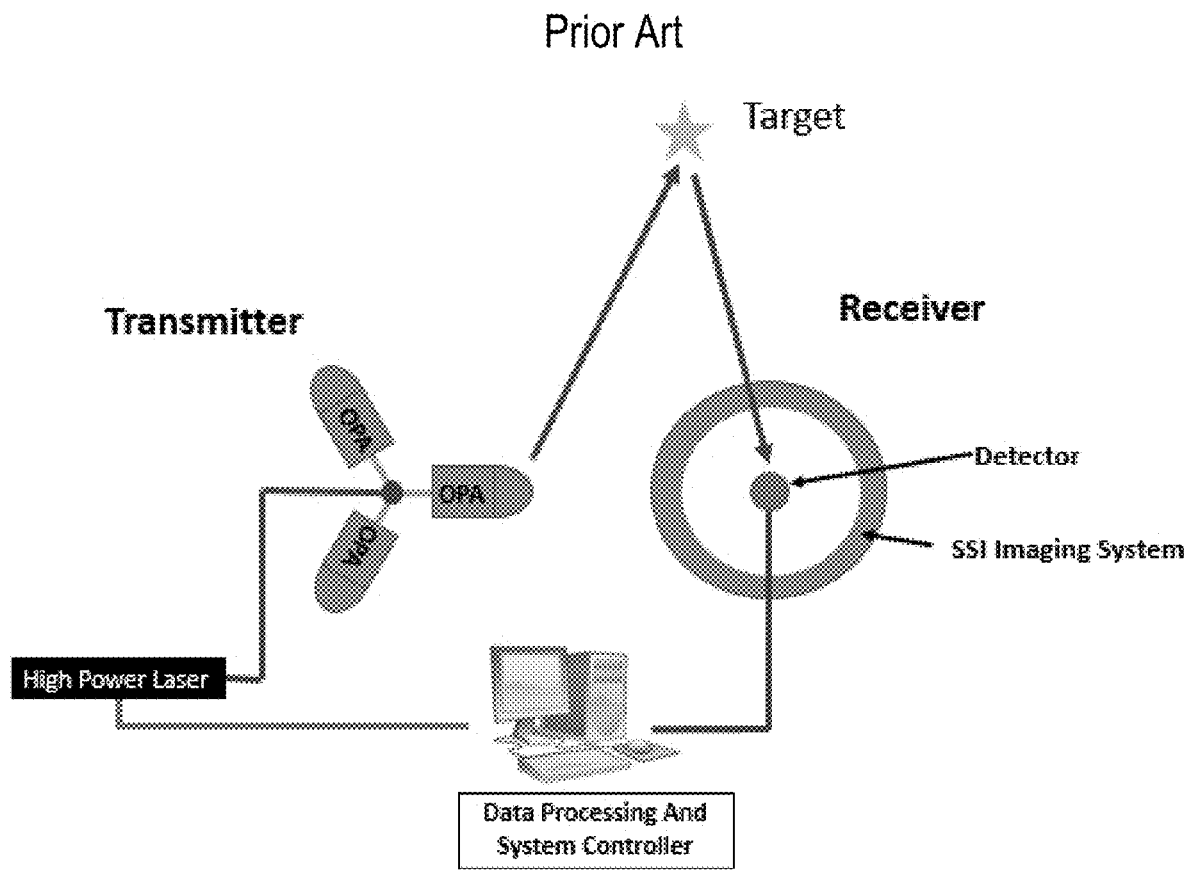
Figure 8: Proposed LIDAR System Architecture

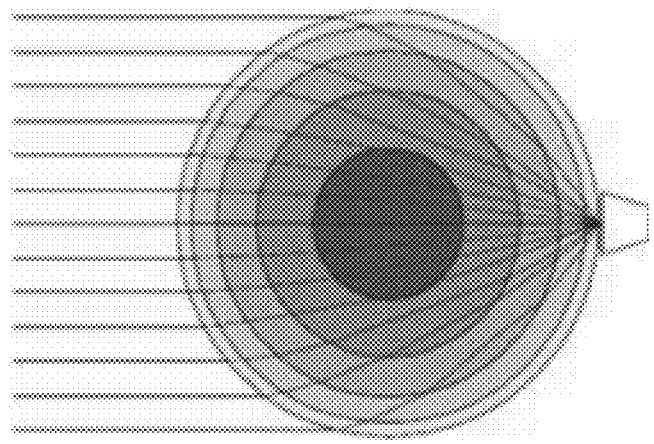
Figure 9: Raytrace of a Standard Luneburg Lens
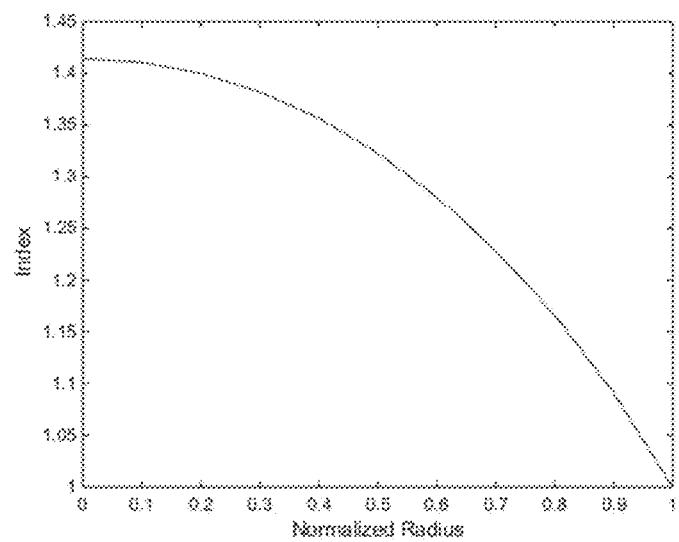
Figure 10: Index Gradient of a Traditional Luneburg Lens

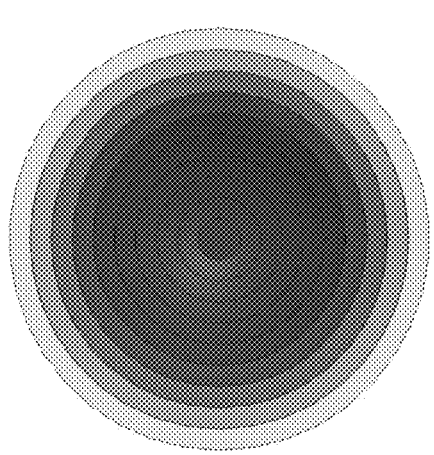
| Index | Dielectric Constant | Inner Radius | Outer Radius |
|---|---|---|---|
| 1.414 | 2 | 0 | 0.1 |
| 1.411 | 1.990 | 0.1 | 0.2 |
| 1.400 | 1.960 | 0.2 | 0.3 |
| 1.382 | 1.910 | 0.3 | 0.4 |
| 1.357 | 1.840 | 0.4 | 0.5 |
| 1.323 | 1.750 | 0.5 | 0.6 |
| 1.281 | 1.640 | 0.6 | 0.7 |
| 1.229 | 1.510 | 0.7 | 0.8 |
| 1.166 | 1.360 | 0.8 | 0.9 |
| 1.091 | 1.190 | 0.9 | 1 |
| 1 | 1 | 1 | Inf |
Figure 11: A Discretized 3D model of a traditional Luneburg Lens
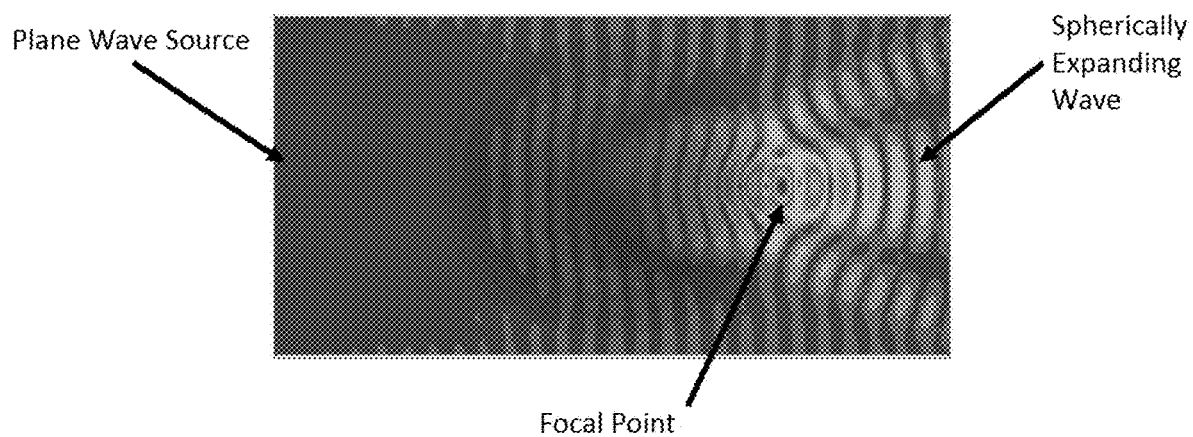
Figure 12: Plane wave excitation of a traditional Luneburg Lens

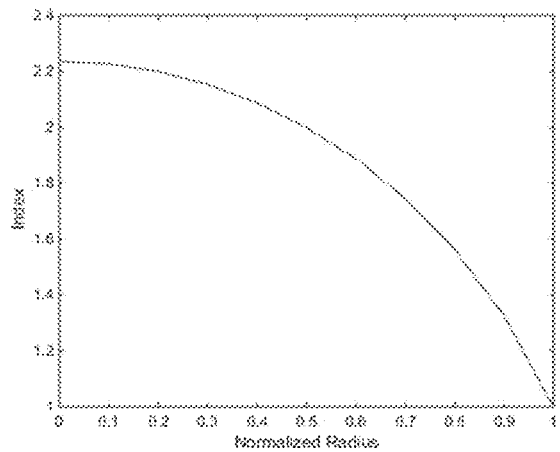
| Index | Dielectric Constant | Inner Radius | Outer Radius |
|---|---|---|---|
| 2.236 | 5 | 0 | 0.1 |
| 2.227 | 4.96 | 0.1 | 0.2 |
| 2.200 | 4.84 | 0.2 | 0.3 |
| 2.154 | 4.64 | 0.3 | 0.4 |
| 2.088 | 4.36 | 0.4 | 0.5 |
| 2.000 | 4.00 | 0.5 | 0.6 |
| 1.887 | 3.56 | 0.6 | 0.7 |
| 1.744 | 3.04 | 0.7 | 0.8 |
| 1.562 | 2.44 | 0.8 | 0.9 |
| 1.327 | 1.76 | 0.9 | 1 |
| 1 | 1 | 1 | Inf |
Figure 13: Continuous and Discrete index variation required to move the focal point halfway to the center.
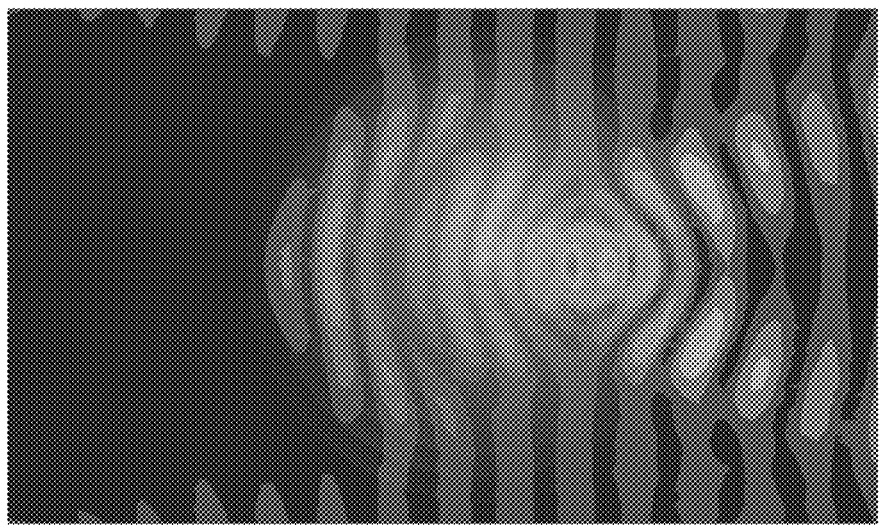
Figure 14: A modified Luneburg Lens to create a focus halfway to the center of the lens

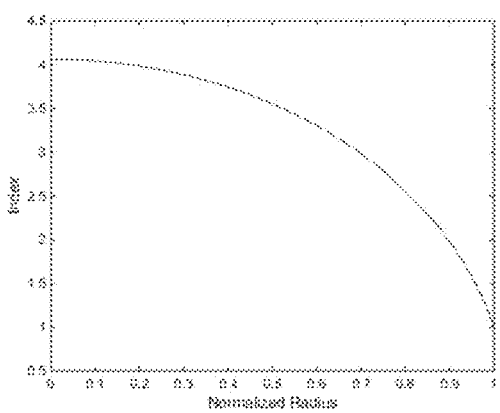
| Index | Dielectric Constant | Inner Radius | Outer Radius |
|---|---|---|---|
| 4.062 | 16.5 | 0 | 0.1 |
| 4.043 | 16.35 | 0.1 | 0.2 |
| 3.985 | 15.88 | 0.2 | 0.3 |
| 3.887 | 15.11 | 0.3 | 0.4 |
| 3.744 | 14.02 | 0.4 | 0.5 |
| 3.553 | 12.63 | 0.5 | 0.6 |
| 3.305 | 10.92 | 0.6 | 0.7 |
| 2.984 | 8.91 | 0.7 | 0.8 |
| 2.565 | 6.58 | 0.8 | 0.9 |
| 1.986 | 3.95 | 0.9 | 1 |
| 1 | 1 | 1 | Inf |
Figure 15: Continuous and Discrete index variation required to move the focal point as close to the center as possible while maintaining realistic indexes.
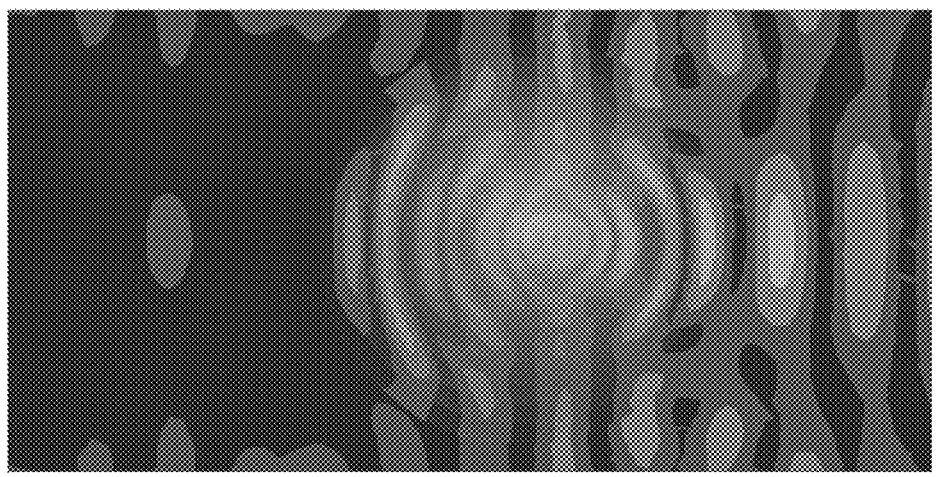
Figure 16: A modified Luneburg Lens to create a focus as close to the center of the lens as possible

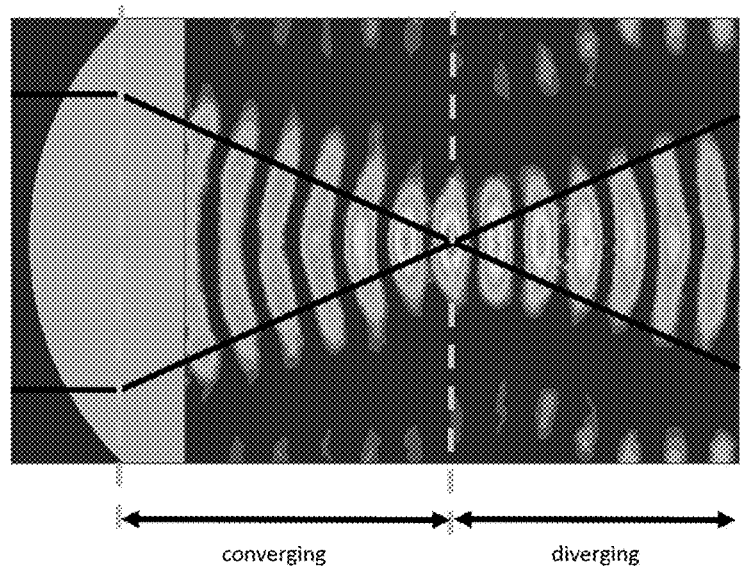
Figure 17: EM solution of a positive lens
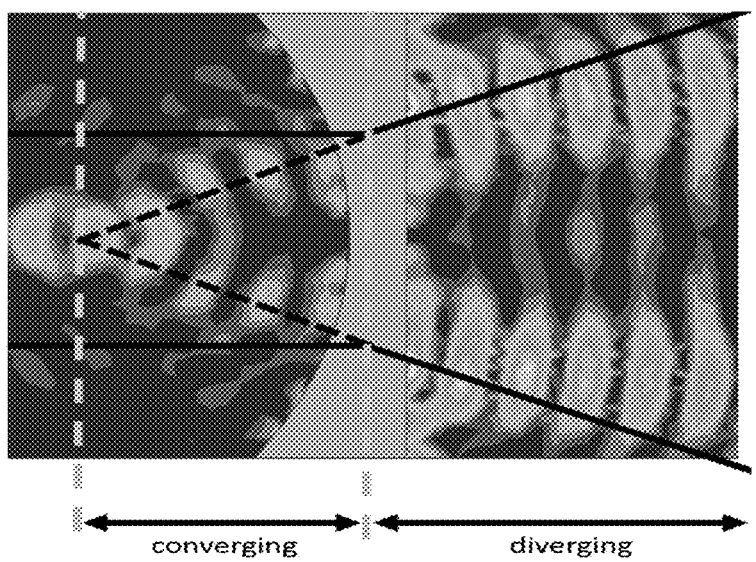
Figure 18: EM solution of a negative lens

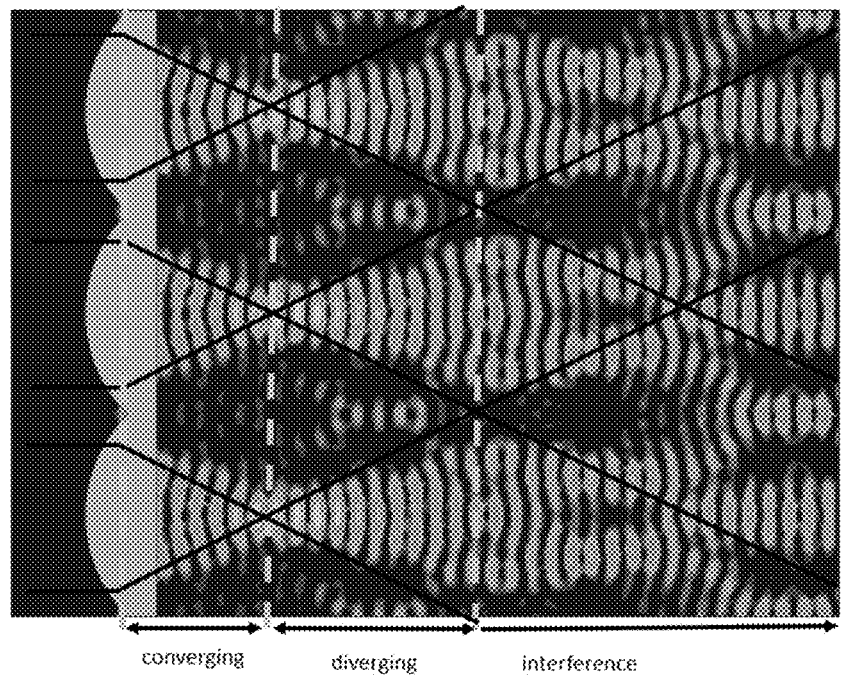
Figure 19: A single column planar lens array showing converging, diverging and interference regions.
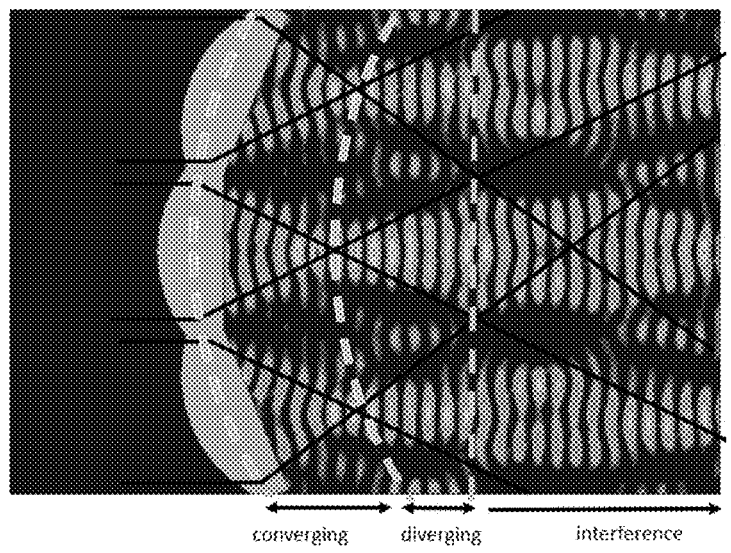
(a) 22.5 degrees of tilt is applied to adjacent lens elements Scale bar

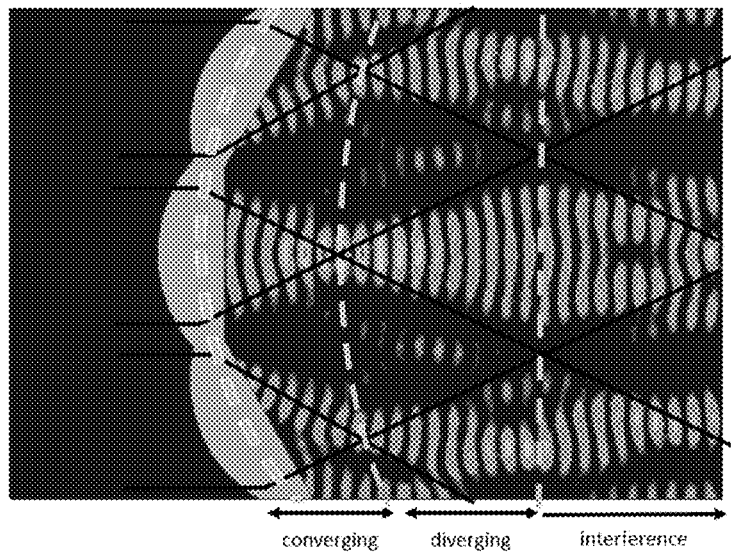
(b) 30 degrees of tilt is applied to adjacent lens element
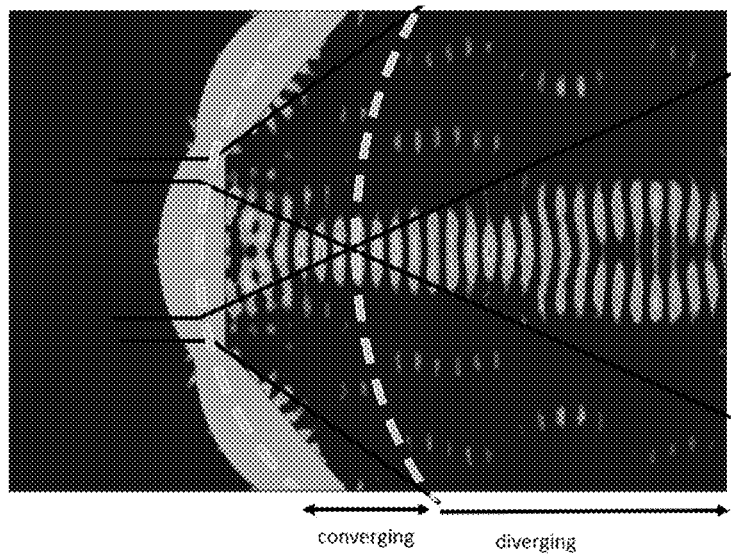
(c) 45 degrees tilt is applied to adjacent lens element
Figure 20: Impact of Lens rotation angle (top = 22.5deg, middle = 30deg, bottom = 45deg)

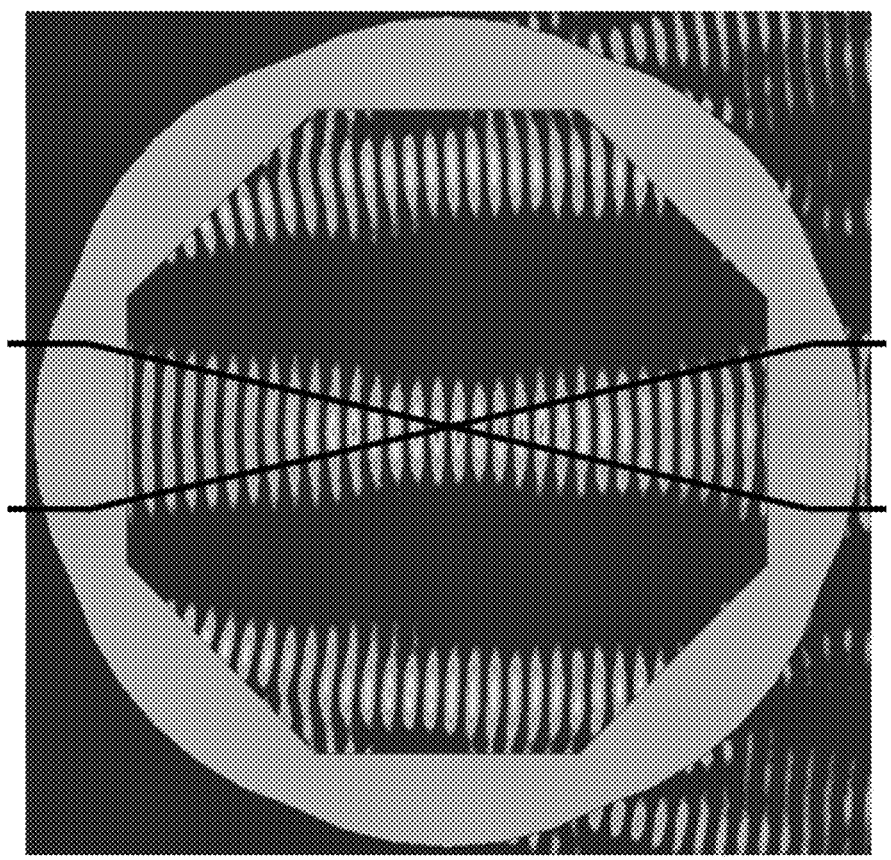
Figure 21: *45deg lens rotation with focal point in center of rotation*

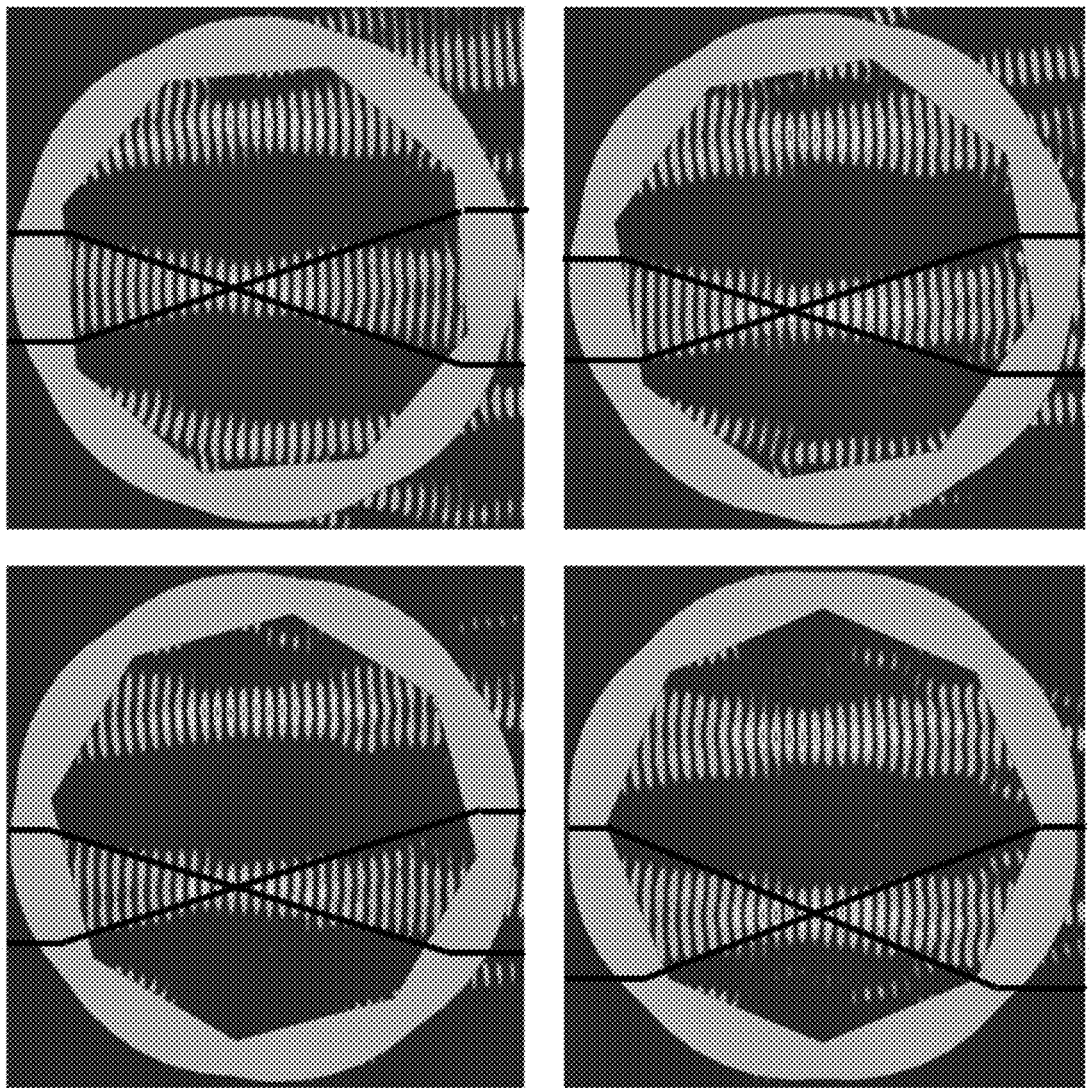
Figure 22: Impact of system rotation (top left = 5deg, top right = 10, bottom left = 15deg, bottom right = 22.5deg)

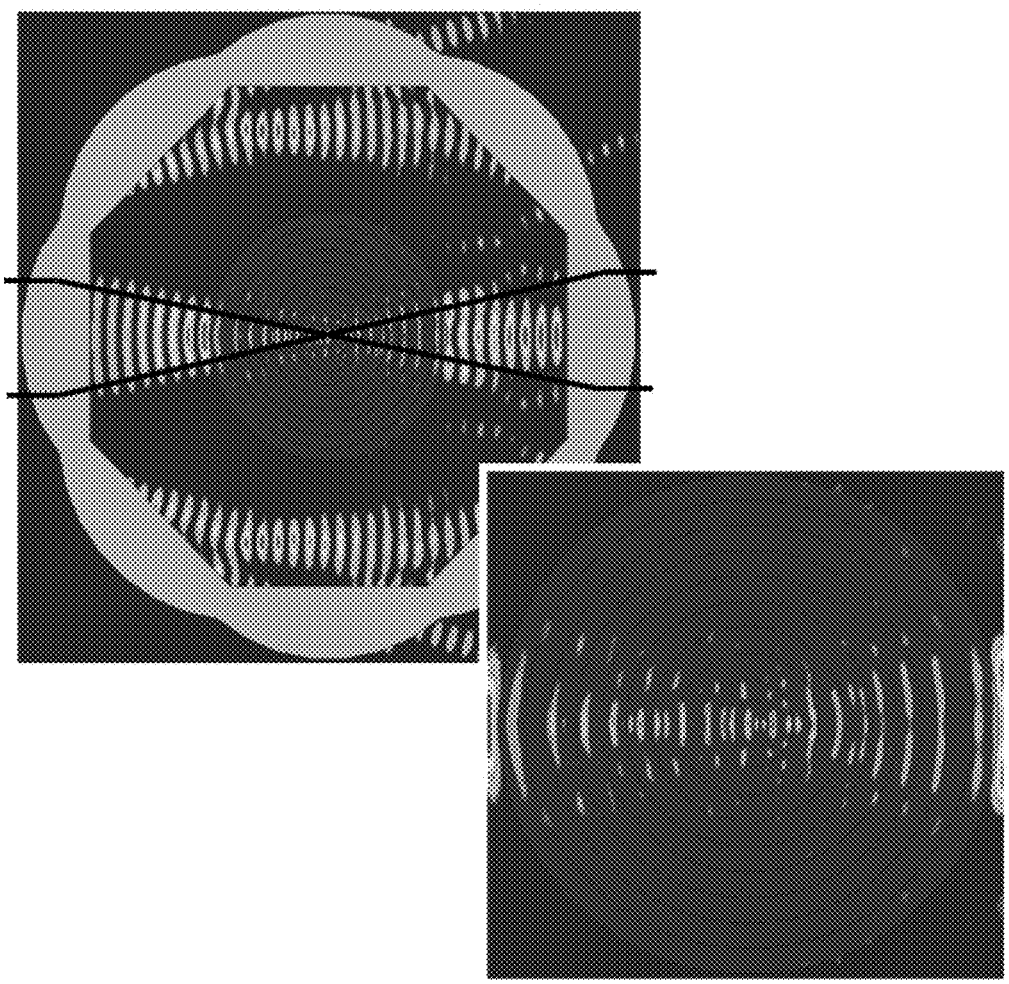
Figure 23: The full imaging system (top left), zooming in on just the Luneburg Lens to more accurately show the focal point

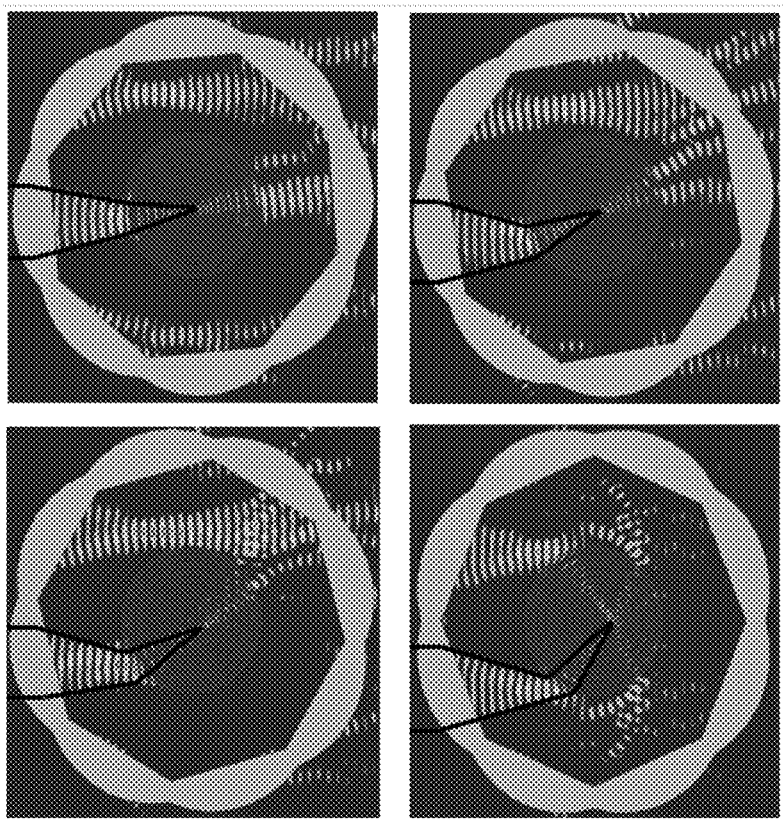
Figure 24: Impact of system rotation (top left = 5deg, top right = 10, bottom left = 15deg, bottom right = 22.5deg)

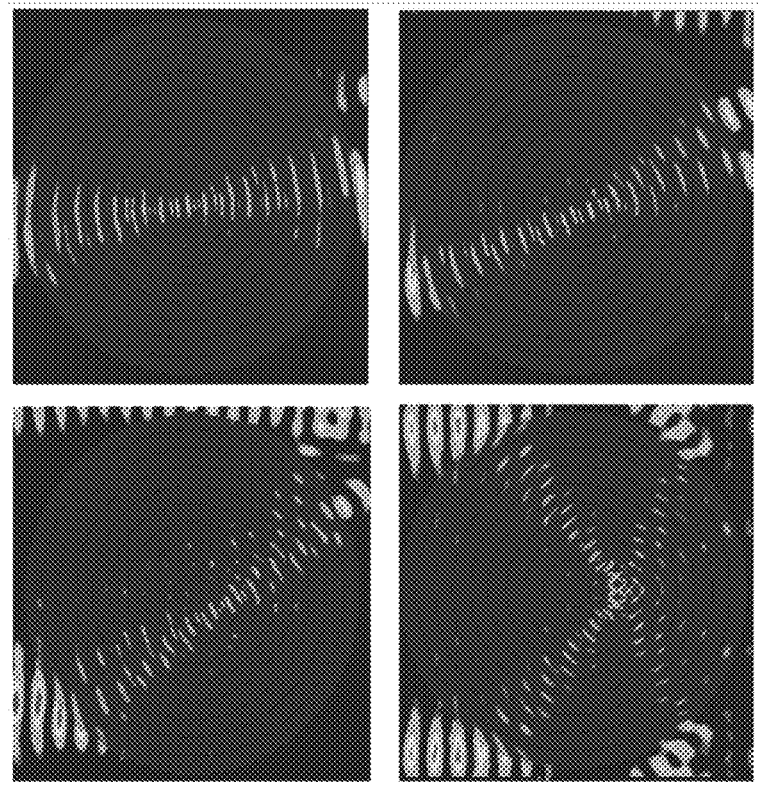
Figure 25: Impact of system rotation (top left = 5deg, top right = 10, bottom left = 15deg, bottom right = 22.5deg
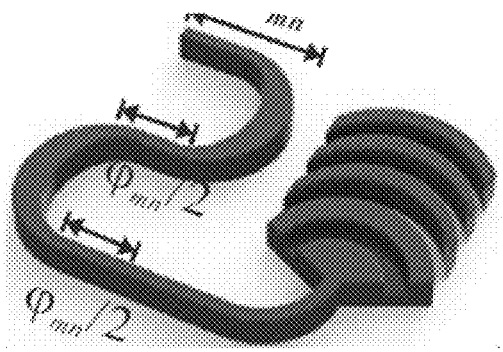 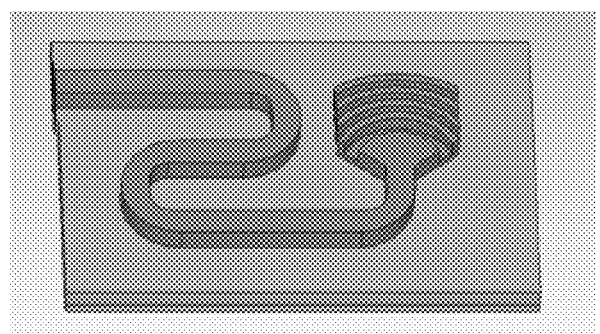
Figure 26: MIT's published antenna model (Left). Recreated CST model (Right)

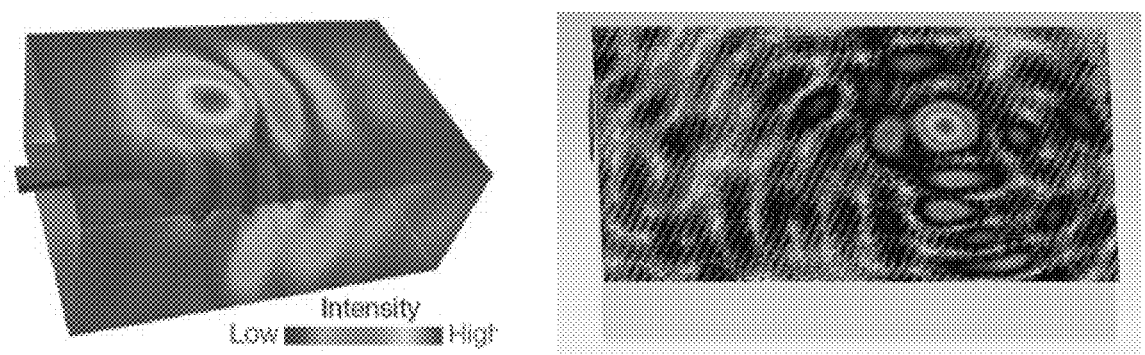
Figure 27: Near Field Electric field of MIT's published antenna model (Left). Recreated CST model (Right)
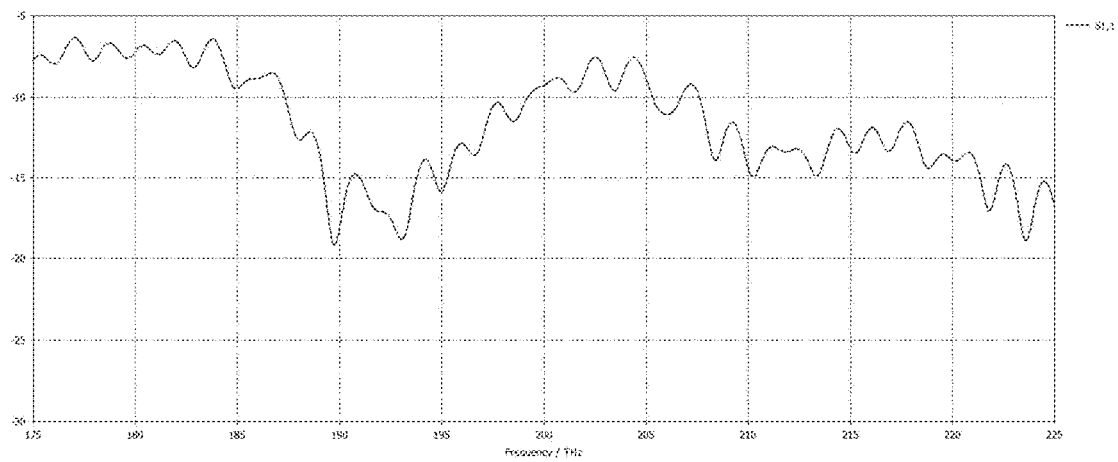
Figure 28: Input Return Loss

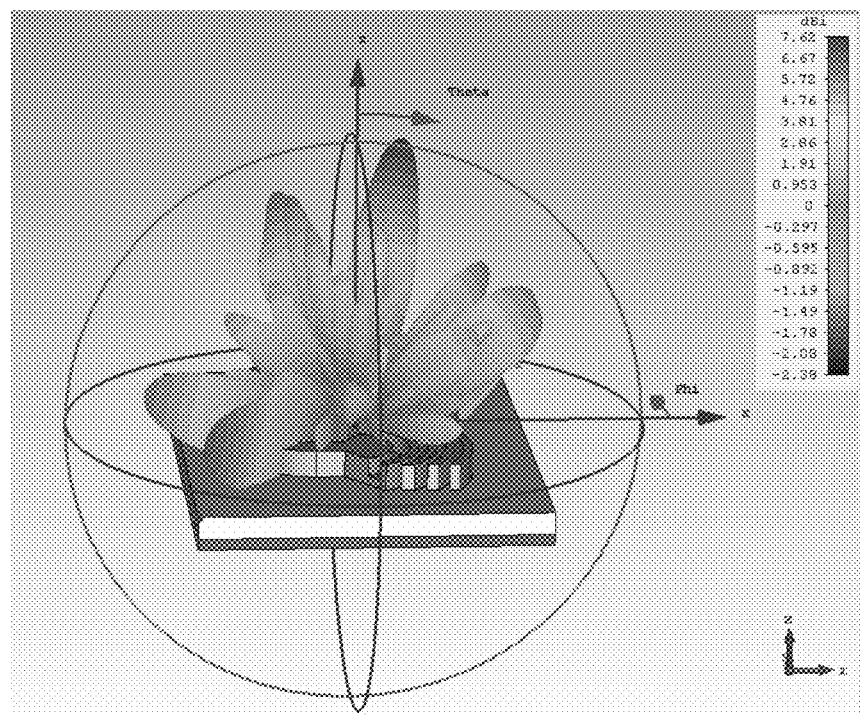
Figure 29: Far Field Radiation Pattern
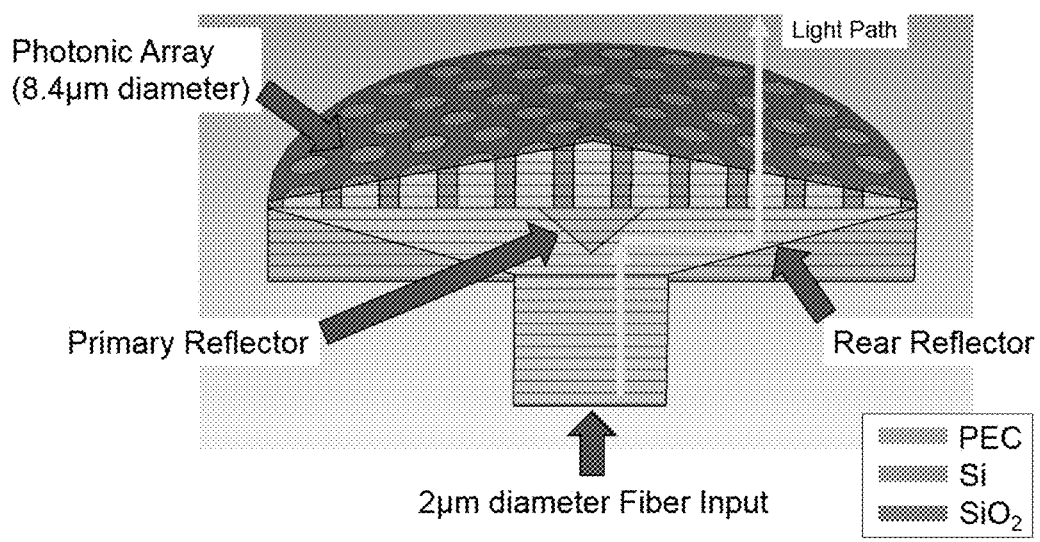
Figure 30: Proposed Optical Array

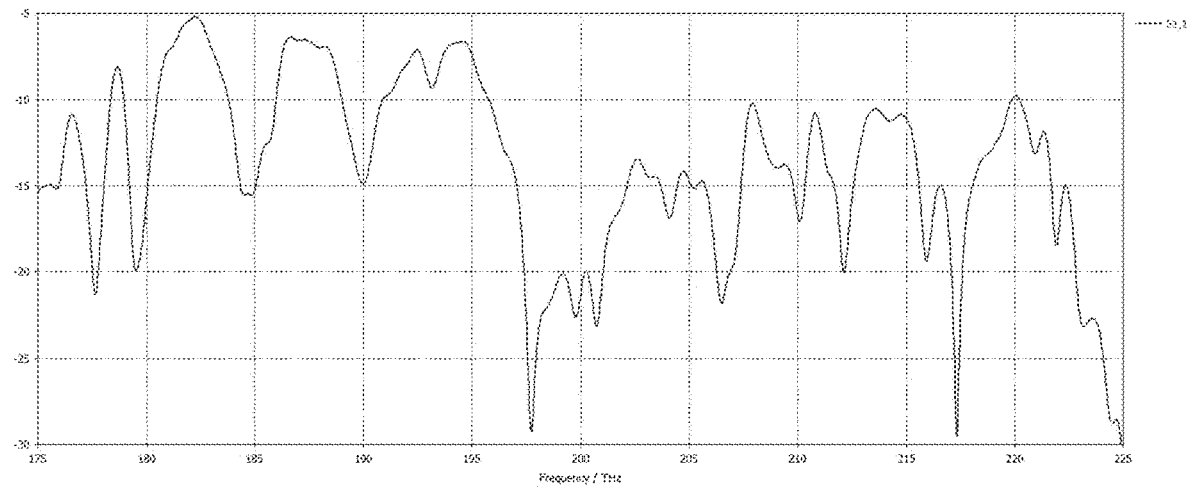
Figure 31: Return Loss of the proposed optical array
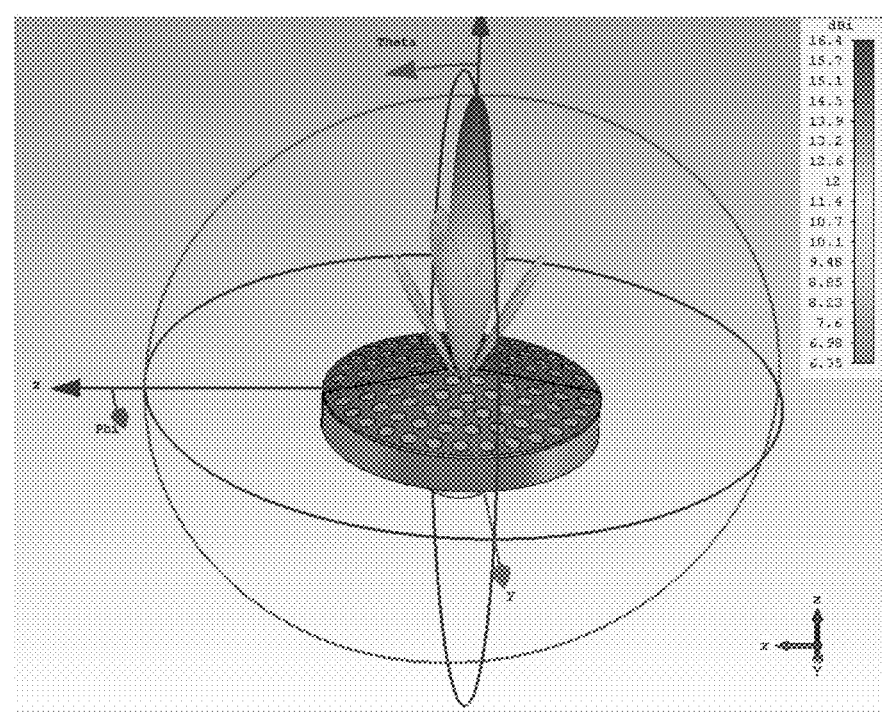
Figure 32: Far Field radiation pattern of the proposed optical array

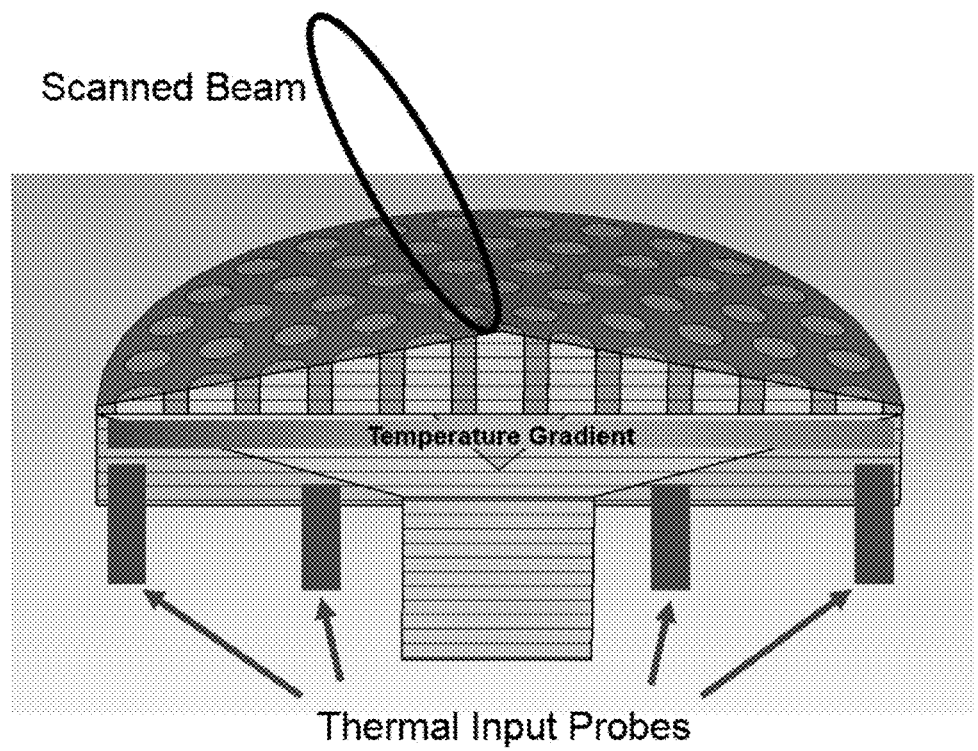
Figure 33: Temperature probes could be added to create the thermal gradient required to steer a beam.
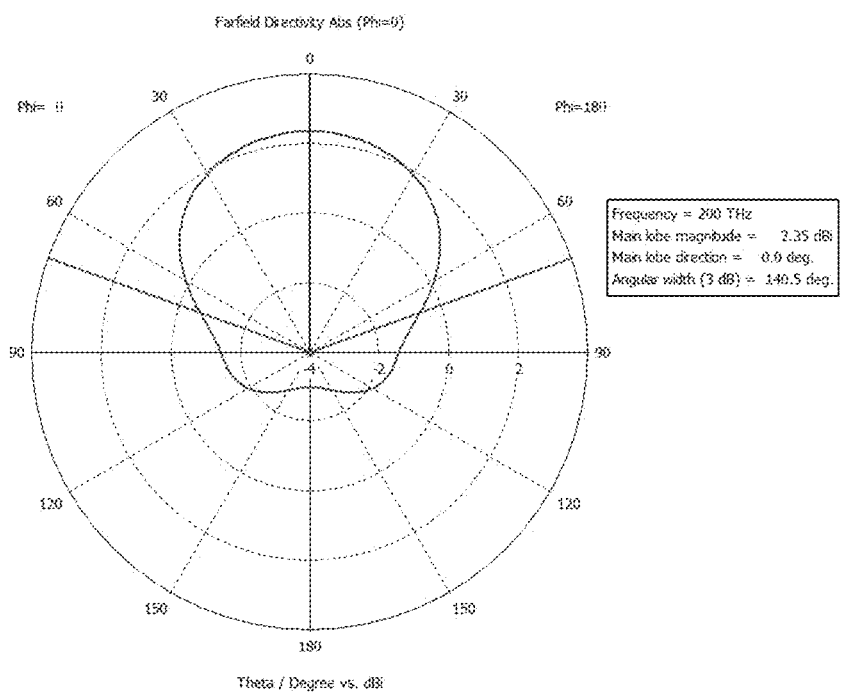
Figure 34: Element factor shows scan capabilities past 70deg with <3dB amplitude rolloff.

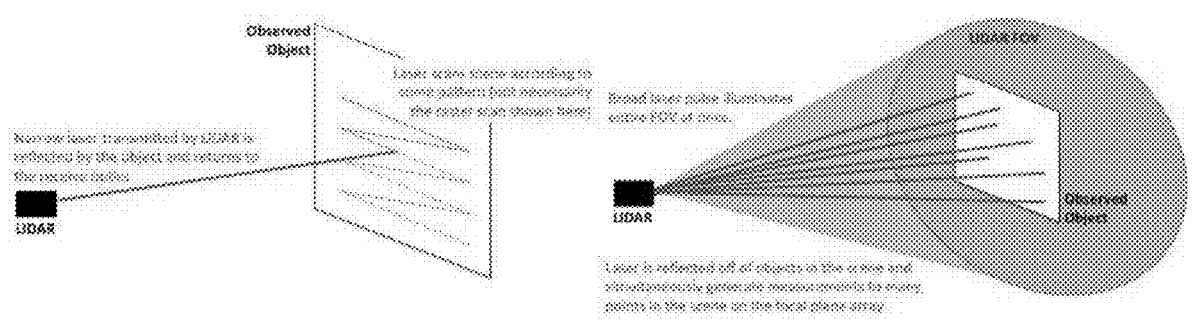
Figure 35: Narrow vs Wide FOV LIDAR Systems

OPTICAL PHASED ARRAYS AND SPHERICAL SHIFT INVARIANT SENSORS FOR USE IN ADVANCED LIDAR SYSTEMS

CROSS REFERENCE TO RELATED APPLICATIONS

The present application is the U.S. National Stage application of International Application PCT/US19/34320 filed May 29, 2019, which relates and claims priority to U.S. Provisional Patent Application Ser. No. 62/677,313, filed May 29, 2018, the entire disclosure of each of which is hereby incorporated by reference.

GOVERNMENT FUNDING

N/A

FIELD OF THE INVENTION

The present disclosure is directed generally to LIDAR systems, and more particularly to optical phased arrays and spherical shift invariant sensors for use in advanced LIDAR systems.

BACKGROUND

LIDAR Systems

A lot of research is currently being done to advance LIDAR technology. LIDAR, or light detection and ranging, is similar to radar but has much higher resolution. The basic principle behind LIDAR is to transmit a beam of light at a target, and measure the returning signal. The time delay can then be used to find the distance to the target and the Doppler shift can be used to find the targets velocity. By steering the transmitted light pulse a full 3D model of the environment can be created.

Currently these systems are being integrated into short and medium range imaging systems. Commercially, they have found to be the ideal solution for remote sensing in autonomous vehicles.

Limitations of Current LIDAR Systems

Limited measurable range is the biggest limitation of current LIDAR systems. As with any imaging system the designer must make a trade; field of view (FOV) vs signal to noise ratio (SNR). In general, designs with a narrow FOV have good SNR but require some sort of gimbal to scan a large area. This means that the LIDAR imaging system needs to physically move, this requires many additional parts, degrades the systems lifetime and decrease mean time between failure. Moving the imaging system is often done with tilting mirrors and servo motors as shown in FIG. 1. The alternative is to use a wide field of view and an extremely high quality detector to improve the systems SNR. Averaging is also often used to improve SNR, but this can be a problem when imaging fast moving objects. This FOV vs SNR tradeoff currently makes LIDAR a poor choice for long range imaging and missile detection systems. In the future, high power lasers and advanced detectors can be integrated to extend the range of LIDAR systems.

Like many companies, Ball Aerospace is actively researching LIDAR technology. TotalSight™ can be mounted on a variety of aircraft and collect wide angle images. Complex stitching algorithms are then used to fuse the imagery and generate broad angle coverage scenes like that in FIG. 2.

Optical Phased Arrays

Similarly to an RF phased array optical phased arrays can be used to quickly scan the FOV of an optical system. By doing this, the system's instantaneous FOV can be reduced (which increases the SNR) without requiring a gimbal. Phased arrays do not require any moving parts and generally yield much higher quality imaging. Recently MIT created such a system as depicted in FIG. 3.

To do this, MIT designed a photonic antenna (FIG. 3) which is fed with a silicon waveguide. By varying the temperature of the waveguide its phase delay can be manipulated. If used in an array a scanned beam can be created.

MIT built and tested an 8×8 array of these temperature controlled elements. The array was designed to work at a wavelength of 1.55 um. When the temperature across the array is held constant (to keep equal phase at each element) the radiation pattern shown in FIG. 4a is created. If a vertical temperature distribution is applied, the radiation pattern is scanned up (FIG. 4b). If a horizontal temperature distribution is applied, the radiation pattern is scanned to the left (FIG. 4c).

Limitations of Current Optical Phased Arrays

The problem with many optical phased arrays (including MIT's) is the size of the element relative to the wavelength. The element shown in FIG. 3 is roughly 2×2 wavelengths. Also, because of the serpentine feed, the element to element spacing is roughly 6 wavelengths. This results in the grating lobes shown in FIG. 4. These grating lobes reduce range and can cause an angle of arrival ambiguity.

Spherically Shift Invariant Imaging

A spherically shift invariant imaging system is one that can (ideally) focus light from any direction in 3D space onto a single point as shown in FIG. 5. In order to do this the system must be perfectly spherically symmetric. By placing a receiver at the focus in the center of the system, range data could be collected without having to physically move the optical system.

Limitations of Current Spherically Shift Invariant Systems

In practice, the system cannot be made perfectly symmetric so the focus slightly varies from center as a function of angle of arrival. In a LIDAR system some defocus is generally acceptable, since the primary importance is SNR.

In research it was not found any truly spherically shift invariant systems. However, a few monocentric imaging systems have been developed in recent years. In these systems, the focus occurs behind a monocentric lens as shown in FIG. 6. Ideally, the monocentric lens is spherically symmetric and the focal distance is constant regardless of angle of arrival.

An array of detectors can then be placed behind the monocentric lens, each of which can capture a small FOV as shown in FIG. 7. Although a monocentric system such as this can image a very large field of view its spherically shift invariance is limited because the detectors have to be placed outside of the optics. Because the focus occurs behind the objective the system the FOV is fundamentally limited to a single hemisphere (≤180°).

Accordingly, there is a need in the art for an optical device/optical system that can focus light into at the center of optical system so that light from all the direction (4-pi direction) is captured by a single detector.

SUMMARY

The present disclosure is directed to an advanced LIDAR system architecture using an optical phased array transmitted and a spherically shift invariant receiver.

According to an aspect is a design of the advanced LIDAR system shown in FIG. 8. This system combines an optical phased array transmitter with a spherically shift invariant receiver to produce a system that is capable of full 360 degree LIDAR imaging. In the following sections the design and performance of both the optical phased array and Rotationally Shift Invariant (RSI) imaging systems are shown. Lastly, the performance of such a system will be compared to modern day state of the art LIDAR systems.

According to an embodiment, a LIDAR system, comprising an optical phased array to transmit a narrow high power beam, wherein the optical phased array uses a photonic bandgap structure to create elements which are spaced at approximately 0.5λ, and a spherically shift invariant receiver comprising a macroscopic lens array with a radially symmetrical Luneburg type lens to bring light from any direction into focus at its center, whereby combining the transmitter with the receiver provides an advanced LIDAR system which can scan a full 360 degree sphere.

According to an embodiment, the LIDAR system further comprises temperature probes uniformly spaced around the optical phased array, and means for varying the temperature of the temperature probes to create a thermal gradient, thereby permitting the system to be steered.

According to an embodiment, the macroscopic lens array is spherical of predetermined diameter and the radially symmetrical Luneburg type lens is positioned at the center of thereof and is sized about 40% the predetermined diameter.

According to an aspect, a photonic array is provided that comprises: a fiber input for inputting light: a primary reflector positioned to receive the input light: a secondary reflector positioned to receive light reflected off of the primary reflector; and a photonic structure comprising an array of high dielectric rods embedded in a low dielectric material, wherein the dielectric rods are spaced at approximately 0.5 wavelength apart.

According to an embodiment, the primary reflector is cone shaped with its reflective walls tapering inwardly towards a point from the photonic structure.

According to an embodiment, the secondary reflector comprises an outwardly tapering reflective wall extending upwardly from the terminal end of the fiber input to the lower periphery of the photonic structure.

According to an embodiment, the photonic array further comprises temperature probes uniformly spaced around the array, and means for varying the temperature of the temperature probes to create a thermal gradient, thereby permitting the system to be steered.

According to an aspect, a spherically shift invariant receiver comprises a macroscopic lens array; and a radially symmetrical Luneburg type lens to bring light from any direction into focus at its center, whereby an active detection system is formed which can scan a full 360 degree spherical field of view.

According to an embodiment, the macroscopic lens array is spherical of predetermined diameter and the radially symmetrical Luneburg type lens is positioned at the center of thereof and is sized about 40% the predetermined diameter.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which:

FIG. 1: Traditional LIDAR Systems use tilting mirrors and servo motors to physically scan the FOV of the imaging systems;

FIG. 2: A 3D image created by Ball Aerospaces Total-Sight™ system

FIG. 3: Optical Phased Array developed by MIT

FIG. 4: Radiation pattern of MIT's 64 optical phased array when even (a), vertical (b) and horizontal (c) temperature distributions are applied.

FIG. 5: Raytrace of a spherically shift invariant system:

FIG. 6: Raytrace of a Monocentric Objective:

FIG. 7: A Monocentric Imaging System designed by Distant Focus and Duke University:

FIG. 8: Proposed LIDAR System Architecture:

FIG. 9: Raytrace of a Standard Luneburg Lens:

FIG. 10: Index Gradient of a Traditional Luneburg Lens:

FIG. 11: A Discretized 3D model of a traditional Luneburg Lens:

FIG. 12: Plane wave excitation of a traditional Luneburg Lens:

FIG. 13: Continuous and Discrete index variation required to move the focal point halfway to the center:

FIG. 14: A modified Luneburg Lens to create a focus halfway to the center of the lens:

FIG. 15: Continuous and Discrete index variation required to move the focal point as close to the center as possible while maintaining realistic indexes:

FIG. 16: A modified Luneburg Lens to create a focus as close to the center of the lens as possible:

FIG. 17: EM solution of a positive lens:

FIG. 18: EM solution of a negative lens:

FIG. 19: A single column planar lens array showing converging, diverging and interference regions:

FIG. 20: Impact of Lens rotation angle (top=22.5 deg, middle–30 deg, bottom=45 deg):

FIG. 21: 45 deg lens rotation with focal point in center of rotation 25

FIG. 22: Impact of system rotation (top left=5 deg, top right=10, bottom left=15 deg, bottom right=22.5 deg):

FIG. 23: The full imaging system (top left), zooming in on just the Luneburg Lens to more accurately show the focal point FIG. 24: Impact of system rotation (top left=5 deg, top right=10, bottom left=15 deg, bottom right=22.5 deg);

FIG. 25: Impact of system rotation (top left=5 deg, top right=10, bottom left=15 deg, bottom right=22.5 deg:

FIG. 26: MIT's published antenna model (Left). Recreated CST model (Right)

FIG. 27: Near Field Electric field of MIT's published antenna model (Left). Recreated CST model (Right);

FIG. 28: Input Return Loss:

FIG. 29: Far Field Radiation Pattern:

FIG. 30: Proposed Optical Array:

FIG. 31: Return Loss of the proposed optical array:

FIG. 32: Far Field radiation pattern of the proposed optical array:

FIG. 33: Temperature probes could be added to create the thermal gradient required to steer a beam:

FIG. 34: Element factor shows scan capabilities past 70 deg with <3 dB amplitude rolloff; and FIG. 35: Narrow vs Wide FOV LIDAR Systems.

DETAILED DESCRIPTION OF EMBODIMENTS

The present disclosure describes a LIDAR system architecture which transmits light via an optical phased array and receives the reflected signal with a spherically shift invariant sensor. As shown in FIG. 8, the LIDAR system 10 comprises a data processing and system controller (computer) 12, a high power laser 14 that transmits energy to an optical phase array 16 which transmits light to a target of interest 18. The light reflected off of the target is received by the spherically shift invariant receiver 20 that has a detector 22 in its center which can then transmit the received light energy back to the data processing and system controller 12 for processing.

The Design of a Spherically Shift Invariant Receiver

The Luneburg Lens

A Luneburg Lens is a spherical symmetric gradient index lens that typically focusses incoming collimated light to a point at the opposite side of the lens as shown in FIG. 9. The index of the Luneburg lens decreases radially from the center to the outer surface of the lens. Luneburg Lenses are fairly common at microwave frequencies and are occasionally used at optical wavelengths.

Design of a Traditional Luneburg Lens

The index of a traditional Luneburg lens varies as a function of radius according to the formula below:

$$N(r) = [N_{core} * \sqrt{2 - (K_{lune} * r)^2}]/\sqrt{2}$$

where:

$$K_{lune} = \sqrt{2 * \left[1 - \left(\frac{N_{ctx}}{N_{core}}\right)^2\right]}$$

Where, r is the normalized radius within the lens, $N_{core}$ is the index at the center of the lens, and $N_{ctx}$ is the index at the outer diameter of the lens.

Typically, the index at the core of the lens is equal to $\sqrt{2}$ and the index at the outer diameter of the lens is equal to 1. Using these formulas the above equation can be simplified to:

$$N(r) = \sqrt{2 - (r)^2}$$

Since a continuous distribution will be difficult to fabricate in optical wavelength of 1.55 um domain and model in a 3D EM simulation by HFSS (a 3D FEM Electromagnetic simulator), ten discretized concentric spheres are used—each with a slightly different index based on their radius. This can be seen in FIG. 11.

In testing, this 3D model was then simulated in HFSS (a 3D FEM Electromagnetic simulator). The Luneburg Lens was excited with a collimated beam with a wavelength of 1.55 um. The Luneburg Lens itself had a diameter of 10 μm. The electric field can be seen coming to a focus at the opposite side of the lens in FIG. 12. The performance of the lens is independent of the lens radius and angle of arrival.

Modified Luneburg Lens

In recent years it has been shown that by increasing the gradient of the dielectric constant inside the Luneburg lens the focal point can be shifted inside the lens. In a paper published by Southeast University in Nanjing China, a Luneburg Lens was developed with an index varying according to the formula:

$$n(r) = \frac{\sqrt{a^2 + f^2 - r^2}}{f}$$

where r is the normalized radius within the lens, a is the lens radius and f is the distance from the focus to the center of the lens.

It was desired to shift the focal point halfway to the center of the lens (f=a/2). Using the above formula an index gradient can be seen below (both continuously and in discrete segments for the HFSS model).

Again, this was modeled in HFSS with a collimated incident beam with a wavelength of 1.55 um. FIG. 14 confirms that the formula is accurate.

In a spherically shift invariant system it is desired to have the focal point in the center of the lens. Unfortunately is can be clearly seen that as f approaches 0 the index at the center of the lens approaches infinity. This begs the question: how far into the center of the lens can the focal point be moved while using a realistic but extremely high index (~4).

Again, this was modeled in HFSS with a collimated incident beam with a wavelength of 1.55 um. FIG. 16 shows that the focal point was moved ~80% of the way to the center of the lens. Also, note that the wave exiting the Luneburg Lens is approximately planar in nature.

Electromagnetic Analysis of Lenses and Lens Arrays

The following sections show the electromagnetic performance of various lenses and lens arrays to be combined to Luneburg shell-like lens. First, the simple concave and convex lens are modeled and simulated. These lenses are then combined into planar and spherical lens arrays. A spherical lens array is then designed to bring a planar wavefront into focus at its center.

Single Lenses

In general there are two types of lenses: positive and negative. Positive lenses are typically bi-convex or close to plano-convex in geometry and cause an incident planar wave to converge to a focal point. After the focal point, the wavefront diverges as shown in FIG. 17. Negative lenses are typically bi-concave or close to plano-concave in geometry and, cause an incident planar wavefront to converge to an imaginary focal point before the lens and diverge after the lens as shown in FIG. 18. The focal point of either lens can be adjusted by changing the index or radius of curvature as described by the lens maker's equation:

$$\frac{1}{f} = (n-1)\left(\frac{1}{R_1} - \frac{1}{R_2}\right)$$

Planar Lens Arrays

Lenses can then be stacked to form arrays. The first, and simplest, example is a single column planar lens array as shown in FIG. 19. As demonstrated, each lens within the array converges to its own distinct focal point. Eventually the divergent waves run into each other and begin to interfere. At this point the field plot becomes clearly distorted.

Spherical Lens Arrays

Instead of translating the lens to form a planar array they can also be rotated to form a spherical array as shown in FIG. 20. Here, three cases were run: a 22.5 deg. 30 deg and 45 deg rotation. The lens in the center is illuminated on axis and produces a typical focal point. The two rotated lenses are illuminated in off axis configuration, which produces a shift in their focal point with respect to the original optical axis of each lens elements. The larger the angle, the further the focal point was shifted from the original optical axis. However, direction of propagation of the wave is unchanged as expected from thin lens theory. After the focal point, the wavefront cleanly diverges until they begin to interfere with one another.

At a 45 deg rotation, the shift was so large that a clear focal point was not formed similar to geometrical aberrations appearing in large angle of incidence. The lenses could then be designed to force the focal point into the center of rotation without interference as shown in FIG. 21.

Sensitivity to Angle of Incidence

The imaging system is essentially four 4f telescopes with each of their central focal points collocated at the center of rotation. As with any 4f telescope the location of the focus is sensitive to the angle of incidence. FIG. 22 shows three examples of the imaging system being rotated about its center: 5 deg, 10 deg, 15 deg and 22.5 deg rotation. In all cases the focal point moved far enough away from the center of the system to significantly degrade the performance. Although this system is not spherically shift invariant, it has the capability to bring eight aligned plane waves into focus at the same point.

Combining the Modified Luneburg Lens (Radially Symmetrical Luneburg Type Lens) with a Lens Array The radially symmetrical Luneburg type lens was placed directly in the center of the spherical lens array and sized to be roughly 40% of the lens array's diameter. This was done to ensure that only the wave propagation from one lens would enter the radially symmetrical Luneburg type lens—therefore reducing the potential for interference. The focal distance of the lens array was slightly modified to ensure that the focal point would still occur in the center of the imaging system as shown in FIG. 23.

Sensitivity to Angle of Incidence

Again, the lens array was rotated to 5 deg, 10 deg, 15 deg and 22.5 deg in order to assess the impact of angle of incidence on the imaging system. As demonstrated, the radially symmetrical Luneburg type lens was able to refocus the incident wave close to the center of the imaging system as shown in FIG. 24 (and more clearly in FIG. 25.) Although the quality of focus appears to be degraded, this is not a major bottleneck for a system such as LIDAR where the user cares more about SNR than aberrations. This imaging system was able to keep the focus within 10% of the center for all angles of incidence—a significant improvement over the system without the radially symmetrical Luneburg type lens.

The Design of an Optical Phased Array Transmitter

Simulation of MIT's Optical Phased Array

In an effort to recreate MIT's photonic antenna, a model was created in CST—a 3D EM FDTD package. This model was simulated, tuned and analyzed. Results appear to be very similar to MIT's documented findings.

3D FDTD EM Model

A 3D model was created in CST which strongly resembled MIT's published antenna (FIG. 26). Similar to MIT's model the radiator was modeled as Silicon (pink) on a Silicon Dioxide substrate (green) with a PEC ground plane (grey). The model was roughly 7×9 um and meshed with a density of 15 cells per wavelength, 6 million total cells. It should be noted that this is extremely large for an antenna which is desired to radiate at 1.55 um.

A waveguide input was created in the top left corner. Energy propagates through the serpentine waveguide feed and radiates from the grating based antenna. The field 1 um from the top of the silicon waveguide is plotted in FIG. 27. Near field results are very similar to MIT's published results.

3D FDTD EM Simulation Results

The input return loss of the antenna is plotted in FIG. 28. A fairly good 17 dB match was achieved at the desired 1.55 um wavelength (193THz). The high frequency ripple is due to a mismatch at the radiator. The farfield of the antenna was also calculated (FIG. 29). This radiation pattern is extremely erratic. This is due to the large element size. A peak gain of 7.62 dB was achieved.

Reason for the Poor Far Field Radiation

The poor radiation pattern is a major draw back of MIT's phased array system. As mentioned this is due to the large element size, which is roughly 2×2 wavelengths. Because the radiation pattern is not well behaved, the overall gain is reduced. This will reduce the overall range of the remote sensing system. Also, because the serpentine feed is placed between each element, the element to element spacing is very large (roughly 9 µm or 6 wavelengths). This causes significant grating lobes as shown in FIG. 4.

Design of a Fixed Optical Array

In order to have better control of the farfield radiation pattern smaller elements need to be used. Also, the spacing between the elements needs to be much smaller (preferably less than 0.5 wavelengths). A design with these characteristics was created and simulated in CST.

3D FDTD (Finite-Difference Time-Domain) EM Model

The proposed model antenna 100 can be seen in FIG. 30. As indicated it consists of a 2 um fiber input 102, a primary reflector 104 and rear reflector 106, and a photonic structure 108. The photonic structure 108 consists of an array of high dielectric (silicon) rods 110 embedded in a low dielectric material (silicon dioxide) 112. The primary reflector is cone-shaped and positioned with its reflective walls tapering inwardly towards a point from the photonic structure 108, and the secondary reflector includes an outwardly tapering reflective wall extending upwardly from the terminal end of the fiber input 102 to the lower periphery of the photonic structure 108. The rods 110 are 0.5 um in diameter with 0.75 um spacing (slightly less than 0.5 wavelength). The antenna 100 has a diameter of 8.4 um (5.6 wavelengths). The model was meshed at a density of 10 cells per wavelength, a total of 27 million cells.

3D FDTD EM Simulation Results

The input return loss of the new photonic optical array is plotted in FIG. 31. It tuned up a little higher than expected (200THz or 1.5 um) but functions very well. A 20 dB match was achieved. The radiation pattern at 1.5 um is also shown (FIG. 32). It is clearly much better behaved. A peak gain of 16.4 dB was achieved.

Comparison to MIT's Array

The new photonic optical array 100 offers many advantages over MIT's element. With roughly the same input match a much higher gain is achieved. Sidelobes are also reduced and much more symmetric. With more tuning, higher gain and lower sidelobes should be possible. Furthermore, the antenna array can be easily scaled if higher gain is required.

Potential for Phased Array Scanning

One aspect of this sensor is that it is not yet electrically steerable in actual reduction to practice, although this may be possible as follows. As indicated in FIG. 33, temperature probes 114 could be uniformly spaced in radial locations around the array 100. By varying the temperature of these probes 114 a thermal gradient could be created across the face of the antenna. This gradient could then be manipulated to steer the beam. The radiation pattern of a single element was also simulated (FIG. 34). Results indicate that the beam could be steered to approximately 70 degrees with less than a 3 dB amplitude rolloff.

Quality of System Compared to State of the Art

The LIDAR system architecture presented offers certain advantages compared to state of the art. As previously mentioned, current state of the art systems rely on either physically moving the imaging system in order to scan a region or using a wide angle imager and averaging the reflected signal to improve SNR. This is fine for relatively slow moving environments such as autonomous vehicles and ground mapping but not acceptable in situations where multiple fast moving targets need to be identified and tracked-such as missile defense scenarios. In the proposed system architecture, the optical phased array offers the ability to quickly scan a narrow high-power beam throughout a wide search area. This capability will improve the range and speed of modern state of the art systems. In order to keep up with the transmitter, the reflected signal must also be quickly sampled. By using a separate receiver that can collect light from any angle, the system can simultaneously transmit and receive. This will further improve the speed of the system. The angle of arrival ambiguity of the receiver can be solved by using frequency and/or polarization allocations in the transmitter.

In conclusion, a LIDAR system architecture has been proposed that uses an optical phased array to transmit a narrow high power beam. The optical phased array uses a photonic bandgap structure to create 'elements' which are spaced at approximately 0.52λ. By keeping the elements this close to one another, a grating lobe free radiation pattern can be achieved over the full ±60° scan. Second, a spherically shift invariant receiver has been designed that combines a lens array with a Luneburg Lens to bring light from any direction into focus at its center. By combining the transmitter with the receiver an advanced LIDAR system can be created which can scan a full 360 degree sphere.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

REFERENCES all of which are hereby incorporated by reference:
"The Optics of the Spherical Fish Lens". W. S. Jagger. 17 Oct. 1991.
"Modified Luneburg Lens Based on Metamaterials". Chen et al. 29 Jan. 2015.
http://www.renishaw.com/en/optical-encoders-and-lidar-scanning--39244
https://wp.optics.arizona.edu/optomech/wp-content/uploads/sites/53/2016/11/Synopsis_Salem_Matt.pdf
http://www.ball.com/aerospace/Aerospace/media/Aerospace/Downloads/D1650-TS_LIDAR_0416.pdf?ext=.pdf
https://www.intechopen.com/books/radar-technology/wideband-antennas-for-modern-radar-systems
https://arstechnica.com/science/2013/01/nanoscale-antennas-etched-in-chip-provide-precise-control-of-light/
https://www.osapublishing.org/DirectPDFAccess/B400F37F-BE92-5DBB-D42071D30FF4003B_367522/oe-25-13-14334.pdf?da=1&id=367522&seq=0&mobile=no
https://www.osapublishing.org/DirectPDFAccess/B40ABOAF-DBE1-1231-754DFD361DA451CD_368480/oe-25-14-16274.pdf?da=1&id=368480&seq=0&mobile=no
http://www.jhuapl.edu/techdigest/TD/td3301/33_01-McKenna.pdf
https://www.cambridge.org/core/services/aop-cambridge-core/content/view/2334B1BCD9B56D346E823BB271E6C33E/S1759078716000295a.pdf/div-class-title-microwave-photonic-network-for-active-electronically-scanned-array-radar-div.pdf
http://fullafterburner.weebly.com/next-gen-weapons/radio-optic-phased-array-radar-a-comprehensive-study
https://insights.globalspec.com/article/2013/lidar-gives-sight-to-autonomous-vehicles
http://www.distantfocus.com/projects/aware/

What is claimed is:

1. A LIDAR system, comprising:
    a. an optical transmitter configured to transmit a narrow high power beam, wherein the optical transmitter uses a photonic band gap structure having elements spaced at approximately 0.5 wavelength to eliminate grating lobes, wherein the photonic band gap structure comprises an array of high dielectric rods embedded in a low dielectric material, wherein the rods are each spaced approximately 0.5 wavelength apart; and
    b. a receiver comprising a macroscopic lens array and a radially symmetrical Luneburg type lens to bring light from any direction into focus at its center, whereby an active detection system is formed which can scan a full 360 degree spherical field of view.

2. The LIDAR system according to claim 1, further comprising temperature probes uniformly spaced around the optical transmitter, and means for varying the temperature of the temperature probes to create a thermal gradient.

3. The LIDAR system according to claim 1, wherein the optical transmitter further comprises:
    a. a fiber input for inputting light;
    b. a primary reflector positioned to receive the input light; and
    c. a secondary reflector positioned to receive light reflected off of the primary reflector.

4. The LIDAR system according to claim 3, wherein the dielectric rods are composed of silicon, and the low dielectric material is silicon dioxide.

5. The LIDAR system according to claim 3, wherein the array has diameter greater than 5 wavelengths.

6. The LIDAR system according to claim 3, wherein the primary reflector is cone shaped with its reflective walls tapering inwardly towards a point from the photonic band gap structure.

7. The LIDAR system according to claim 3, wherein the secondary reflector comprises an outwardly tapering reflective wall extending upwardly from the terminal end of the fiber input to the lower periphery of the photonic band gap structure.

8. The LIDAR system according to claim 1, wherein the macroscopic lens array is spherical of predetermined diameter and the radially symmetrical Luneburg type lens is positioned at the center of thereof and is sized about 40% the predetermined diameter.

9. An optical transmitter, comprising:
   a. a fiber input for inputting light;
   b. a primary reflector positioned to receive the input light, wherein the primary reflector is cone shaped with its reflective walls tapering inwardly towards a point from the photonic structure;
   c. a secondary reflector positioned to receive light reflected off of the primary reflector; and
   d. a photonic structure comprising an array of high dielectric rods embedded in a low dielectric material, wherein the dielectric rods are spaced at approximately 0.5 wavelength apart.

10. The optical transmitter according to claim 9, wherein the dielectric rods are composed of silicon, and the low dielectric material is silicon dioxide.

11. The optical transmitter according to claim 9, wherein the array has diameter greater than 5 wavelengths.

12. The optical transmitter according to claim 9, further comprising temperature probes uniformly spaced around the array, and means for varying the temperature of the temperature probes to create a thermal gradient.

13. The optical transmitter according to claim 9, wherein the secondary reflector comprises an outwardly tapering reflective wall extending upwardly from the terminal end of the fiber input to the lower periphery of the photonic structure.

14. A receiver, comprising:
   a. a macroscopic lens array being spherical of predetermined diameter; and
   b. a radially symmetrical Luneburg type lens positioned at the center of the macroscopic lens array and sized about 40% of the predetermined diameter, configured to bring light from any direction into focus at its center, whereby an active detection system is formed which can scan a full 360 degree spherical field of view.

* * * * *